March 10, 1942.  S. O. HUNTINGTON  2,275,906

ELASTIC FLUID TURBINE ARRANGEMENT

Filed Dec. 28, 1939

Inventor:
Sidney O. Huntington,
by Harry E. Dunham
His Attorney.

Patented Mar. 10, 1942

2,275,906

UNITED STATES PATENT OFFICE 2,275,906

ELASTIC FLUID TURBINE ARRANGEMENT

Sidney O. Huntington, Scotia, N. Y., assignor to General Electric Company, a corporation of New York Application December 28, 1939, Serial No. 311,340

3 Claims. (Cl. 253—39)

The present invention relates to elastic fluid turbine arrangements including an elastic fluid turbine having bearings, packings or like elements located on spaced-apart portions of a turbine shaft and requiring oil, water or like fluid during operation. Such fluid is supplied to and drained from such elements by means of a piping system. Often difficulties are experienced in properly locating such piping system. For example, with regard to turbines having an exhaust hood connected to a condenser and supported on a concrete foundation it becomes necessary often either to increase the spacing of the foundation blocks or to provide special grooves or channels within such blocks to accommodate piping.

The object of my invention is to provide an improved construction of such turbine arrangements whereby piping for supplying fluid to elements located near the opposite ends of a turbine is readily accomplished without the necessity of making special provisions regarding the foundation. This is accomplished in accordance with my invention by a turbine arrangement which includes a channel through the exhaust hood or casing for receiving piping to supply oil or like fluid to bearings and other elements on opposite ends of the turbine and to drain such fluid from such elements.

For a better understanding of what I consider to be novel and my invention, attention is directed to the following description and the claims appended thereto in connection with the accompanying drawing.

Figure 1:
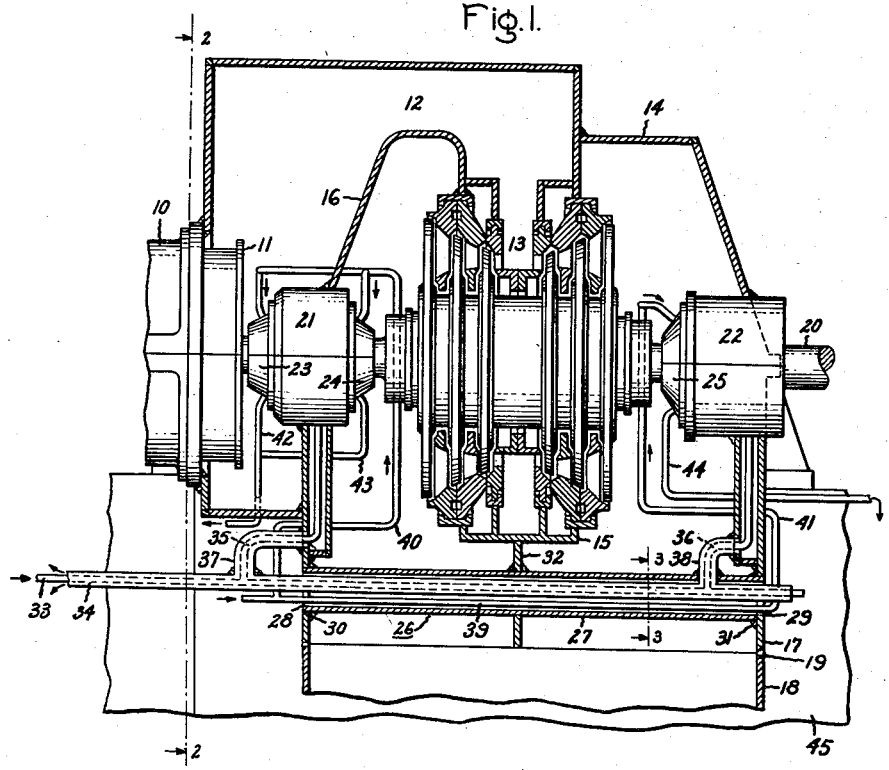
Figure 2:
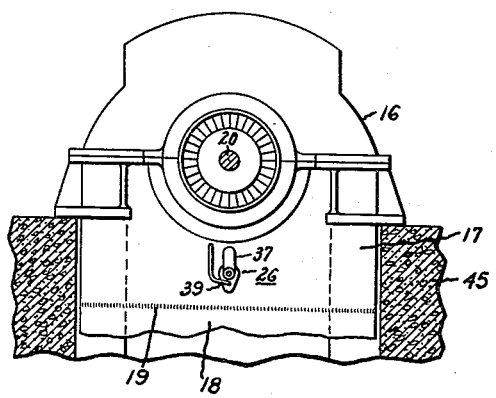
Figure 3:
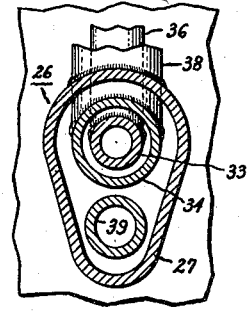

In the drawing Fig. 1 illustrates a turbine arrangement embodying my invention; Fig. 2 is a reduced view along line 2—2 of Fig. 1; and Fig. 3 is an enlarged view along line 3—3 of Fig. 1.

The arrangement comprises a high pressure turbine 10 having an exhaust end 11 connected by a cross-over conduit 12 to an inlet chamber 13 of a double-flow turbine 14. The latter includes an inner casing or shell 15 and an outer casing or exhaust hood 16 which substantially encloses the inner casing and has a lower open portion 17 secured to a condenser inlet conduit 18 by a weld 19. The rotor of the high pressure turbine 10 and the low pressure turbine 17 in the present instance have a common shaft 20 supported by two bearings 21 and 22. The left-hand portion of the bearing 21 is located within the exhaust end of the high pressure turbine and the right-hand portion of the bearing 21 is located within the exhaust end of the low pressure bearing. The bearing 22 is located partly within the right-hand end portion of the exhaust hood 16. The arrangement also includes three water-operated seals or packings 23, 24 and 25. The packing 23 prevents leakage of oil from the bearing 21 into the cross-over conduit 12, that is, into the exhaust end of the high pressure turbine; the seal 24 prevents leakage of oil from the bearing 21 into the exhaust casing of the double-flow turbine and the seal 25 prevents leakage of oil or air from the bearing 22 along the shaft 20 into the exhaust hood of the low pressure turbine. The packings 23 and 24 also prevent the flow of elastic fluid into the bearings. All of these elements, that is, the bearings 21 and 22 and the packings 23, 24 and 25, require fluid, in the present instance oil and water respectively, during operation. A turbine arrangement of this type is more fully disclosed in the patent to O. Junggren, 2,102,416, December 14, 1937, and assigned to the same assignee as the present application.

In order to accommodate piping for supplying fluid to the aforementioned elements I provide in accordance with my invention a channel 26 extending through the outlet portion of the exhaust hood parallel to the shaft 20. The channel in the present instance is formed by a conduit 27 tear-drop-shaped in cross section and having ends secured in openings 28 and 29 of the exhaust hood by means of welds 30 and 31 respectively. The central portion of the conduit 27 is welded by a partition 32 to the inner casing of the low pressure turbine. The tear-drop shape of the conduit offers little resistance to flow of exhaust fluid from the turbine into the condenser. The conduit 27 accommodates part of an oil supply and drain system for the bearings. The system includes a supply pipe 33 for oil or like lubricant and a return pipe 34 which in the present example surrounds or encloses the supply pipe 33. The supply pipe 33 has branches 35 and 36 for conducting oil to the bearings 21 and 22 respectively, and the return pipe 34 has branches 37 and 38 for receiving oil from the bearings 21 and 22 respectively. The supply branches 35 and 36 are enclosed within the return branches 37 and 38 respectively. Water is supplied to the packings 23, 24 and 25 by means of a system including a pipe 39 located below the oil return pipe 34 within the channel 26. The water supply pipe 39 has a branch 40 connected to upper portions of the packings 23 and 24, and another branch 41 connected to an upper portion of the packing 25. Water is drained from the respective packings by means of pipes 42, 53 and 44 respectively which in the present instance are located wholly outside the conduit 27. The turbine as a whole is supported on a concrete foundation 45 having walls closely spaced with the outlet portion 17 of the exhaust hood 16.

Thus, with my invention I have accomplished an improved elastic fluid turbine arrangement in which piping for supplying oil, water or like fluid to elements located near opposite ends of a turbine is accommodated within a channel held on and projecting through the turbine casing. The invention is especially advantageous to double-flow turbines which have an exhaust hood surrounding an inner turbine casing or shell and connected to a condenser located within or below the turbine foundation. Such a double-flow turbine broadly constitutes a double-shell turbine and my invention from this viewpoint includes a piping system extending through the space formed between the inner and outer shell of a double-shell turbine. An important advantage of such arrangement is that the portion of the piping system connecting bearings, packings or like elements located adjacent opposite ends of the turbine may be completely installed within the factory. Another and even more important advantage is that the arrangement of the piping system within the turbine casing renders the design and the provision of the turbine foundation independent thereof. The turbine foundation as shown in Fig. 2 may be closely spaced with the outer turbine shell or exhaust hood and no longer need be provided with channels or grooves for accommodating the piping.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is,

1. Elastic fluid turbine arrangement comprising a foundation, a double-flow turbine having a shell and an exhaust hood substantially surrounding the shell and having a portion enclosed in the foundation, shaft bearings located near opposite ends of the hood, an oil supply and drain system including piping for the bearings, and a conduit extending between opposite ends of the enclosed portion of the exhaust hood to form a channel for accommodating part of said piping.

2. Elastic fluid turbine arrangement comprising a foundation, a double-flow turbine having a shell and an exhaust hood surrounding the shell and having an outlet portion enclosed in the foundation, a rotor, shaft bearings and water packings associated with opposite ends of the rotor, a piping system for supplying lubricant and water to the bearings and packings respectively and for draining lubricant and water therefrom, and means accommodating the piping system including a conduit extending parallel to the shaft and connected to openings in opposite end portions of the outlet portion of the exhaust hood.

3. Double flow turbine having an exhaust hood, a foundation for supporting the turbine having an opening through which a portion of the exhaust hood projects, a channel extending parallel to the turbine axis and connected between openings formed in opposite ends of the exhaust hood, said channel being teardrop-shaped in cross-section to constitute a minimum resistance to flow of exhaust fluid through said portion, turbine shaft bearings located near opposite ends of the hood, and an oil supply system including piping extending through the channel and connected to the bearings, the provision of said channel extending through the exhaust hood eliminating the necessity of providing channels in the foundation and permitting assembly of said piping prior to installation of the turbine on the foundation.

SIDNEY O. HUNTINGTON.